(12) United States Patent
Suzuki (10) Patent No.: US 8,139,295 B2
(45) Date of Patent: Mar. 20, 2012

(54) OPTICAL SYSTEM AND EYE PIECE

(75) Inventor: Kenzaburo Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 557 days.

(21) Appl. No.: 12/374,181

(22) PCT Filed: Jul. 12, 2007

(86) PCT No.: PCT/JP2007/064293
§ 371 (c)(1),
(2), (4) Date: Jan. 16, 2009

(87) PCT Pub. No.: WO2008/010560
PCT Pub. Date: Jan. 24, 2008

(65) Prior Publication Data
US 2009/0310220 A1    Dec. 17, 2009

(30) Foreign Application Priority Data

Jul. 20, 2006  (JP) .................................. 2006-197595

(51) Int. Cl.
*G02B 3/08* (2006.01)
*G02B 5/18* (2006.01)

(52) U.S. Cl. ........................................ 359/742; 359/576
(58) Field of Classification Search .................. 359/576, 359/742–743
See application file for complete search history.

(56) References Cited

U.S. PATENT DOCUMENTS

| 6,130,785 | A | 10/2000 | Abe et al. |
| 6,469,836 | B1 | 10/2002 | Yamamoto et al. |
| 2002/0015222 | A1* | 2/2002 | Kuwabara et al. ............ 359/361 |
| 2002/0163725 | A1* | 11/2002 | Kobayashi .................... 359/569 |
| 2003/0161044 | A1 | 8/2003 | Tokoyoda |
| 2005/0219702 | A1 | 10/2005 | Nakai |

FOREIGN PATENT DOCUMENTS

| EP | 1 239 305 A1 | 9/2002 |
| EP | 1 862 826 A1 | 12/2007 |
| JP | 11-38330 | 2/1999 |
| JP | 2001-021817 | 1/2001 |
| JP | 2004-126393 | 4/2004 |
| JP | 2005292570 A * | 10/2005 |

OTHER PUBLICATIONS

Extended Eruopean search report from European Patent Application No. 07768444.7.

* cited by examiner

*Primary Examiner* — Stephone Allen
*Assistant Examiner* — Kimberly N Kakalec
(74) *Attorney, Agent, or Firm* — Miles & Stockbridge P.C.

(57) ABSTRACT

An eye piece (EL1) is formed having a first lens (L1) having a positive refractive power and a second lens (L2) having a positive refractive power, which are disposed in order from an object (O), and a contact multi-layer diffractive optical element (DOE), which has a first optical element (51) formed with a relief pattern and a second optical element (52) which is in contact with the surface of the first optical element (51) where the relief pattern is formed, is disposed on an optical surface of the first lens (L1) or the second lens (L2).

10 Claims, 8 Drawing Sheets

OPTICAL SYSTEM AND EYE PIECE

TECHNICAL FIELD

The present invention relates to an optical system using diffraction, and more particularly to an optical system used for compact, light and high performance observation optical systems and projection optical systems.

TECHNICAL BACKGROUND

Optical elements using refraction (mainly made of glass) have frequently been used for general optical systems, in order to improve optical performance, particularly image formation performance with decreasing amount of aberrations. However aberration correction flexibility must be improved in order to sufficiently decrease Seidel's five aberrations and chromatic aberration on reference spectral lines, and because of this, the number, size and weight of the optical elements often increase.

To prevent this, an eye piece (optical system) where a plano convex shaped first lens and a plano convex shaped second lens are disposed, in a state of respective convex surfaces facing each other, and a diffractive grating surface is formed on one of the optical surfaces of the first lens and second lens has been proposed (e.g. see Japanese Patent Application Laid-Open No. H11-38330). Thereby an eye piece in which lateral chromatic aberration is well corrected can be obtained with a simple configuration of a small number of lenses, while insuring a predetermined eye relief.

DISCLOSURE OF THE INVENTION

Problems to be Solved by the Invention

In the case of the above mentioned eye piece, however, the optical characteristics (lateral chromatic aberration) with a central wavelength (e.g. d-line) are good, but the optical characteristics in other wavelength areas are not so good.

With the foregoing in view, it is an object of the present invention to provide an optical system with which good optical characteristics can be implemented in all areas of the wavelengths to be used, and an eye piece having this optical system.

Means to Solve the Problems

To achieve this object, an optical system according to the present invention is comprised of a first lens and a second lens having a positive refractive power which are disposed in order from an object, characterized in that a contact multi-layer diffractive optics which has a first optical element formed with a relief pattern and a second optical element which is in contact with the surface of the first optical element where the relief pattern is formed, is disposed on an optical surface of the first lens or the second lens.

In the above invention, it is preferable that the difference of refractive index on the d-line between the first optical element and the second optical element is 0.45 or less, and the condition of the following expression is satisfied: "0.002<D/f<2.0" where D is an air distance on an optical axis between the first lens and the second lens, and a focal length of the entire optical system is f.

In the above invention, it is preferable that the condition of the following expression is satisfied: "0<D/ (f1×f2)<0.15" where f1 is a focal length of the first lens, f2 is a focal length of the second lens, and f1>0 and f2>0.

In the above invention, it is preferable that the condition of the following expression is satisfied: "−0.1<D/(f1×f2)<0" where f1 is a focal length of the first lens, f2 is a focal length of the second lens, and f1<0, f2>0, and |f1|>|f2|.

In the above invention, it is preferable that at least one optical surface of the first lens and the second lens is aspherical.

In the above invention, it is preferable that the contact multi-layer diffractive optics is formed on a surface of the first lens, the surface facing the object.

In the above invention, it is preferable that the first optical element is formed using one of a material with a relatively high refractive index and low dispersion, and a material with a relatively low refractive index and high dispersion, and the second optical element is formed using the other one of the materials, and the condition of the following expression is satisfied: "50<Δvd/Δnd<2000" where Δvd is a difference of Abbe numbers between the first optical element and the second optical element, and Δnd is a difference of refractive indexes on a d-line between the first optical element and the second optical element.

In the above invention, it is preferable that the condition of the following expression is satisfied: "(Eg+EC)/2>0.9×Ed" where Ed is a diffraction efficiency of the contact multi-layer diffractive optics on a d-line, Eg is a diffraction efficiency of the contact multi-layer diffractive optics on a g-line, and EC is a diffraction efficiency of the contact multi-layer diffractive optics on a C-line.

In the above invention, it is preferable that the condition of the following expression is satisfied: "0.0001<p/f<0.003" where p is a minimum pitch of the relief pattern, and f is a focal length of the entire optical system.

In the above invention, it is preferable that the condition of the following expression is satisfied:

$$0.1 < \phi \cdot R/f^2 < 2.0$$

where f is a focal length of the entire optical system, $\phi$ is a pupil diameter, and R is eye relief.

An eye piece according to the present invention is an eye piece for observing an image of an object, having the optical system according to the present invention.

ADVANTAGEOUS EFFECTS OF THE INVENTION

According to the present invention, good optical characteristics can be implemented in all ranges of the wavelengths to be used.

BRIEF DESCRIPTION OF THE DRAWINGS

FIG. 1 are cross-sectional views of multi-layer diffractive optics, where (a) is a cross-sectional view of a non-contact multi-layer diffractive optics, and (b) is a cross-sectional view of a contact multi-layer diffractive optics;

DESCRIPTION OF THE PREFERRED EMBODIMENTS

Embodiments of the present invention will now be described with reference to the drawings. Attempts have been made to include a diffractive optical surface in an optical system, so as to implement high performance and compactness which a dioptric system or catoptric system cannot implement. However in such a single layer diffractive optics having a diffractive optical surface, a flare is generated by the lights in a wavelength area which deviated from a designed wavelength, and this flare could damage image quality and image formation performance, therefore the use of this diffractive optics is limited to a single wavelength, such as a laser light source or narrow wavelength area.

Recently, a diffractive optics called a "multi-layer type" (or laminated type) is being proposed. This type of diffractive optics has a diffractive optical surface which is formed saw tooth (relief pattern), and is a plurality of diffractive elements having a different refractive index and dispersion value layered with or without contact, and maintains a high diffraction efficiency roughly in an entire area of a desired wide wavelength area (e.g. visible light range), that is, the wavelength characteristic is good. For details on the characteristics of such diffractive optics, see "An Introduction to Diffractive Optical Element", supervised by The Society of Applied Physics (Optical Society of Japan), Revised Edition, 2006. The data on the diffractive optical surface shown in the examples is indicated by an ultra high refractive index method, details of which are also included in "An Introduction to Diffractive Optical Element", supervised by The Society of Applied Physics (Optical Society of Japan), Revised edition, 2006.

Figure 1A:
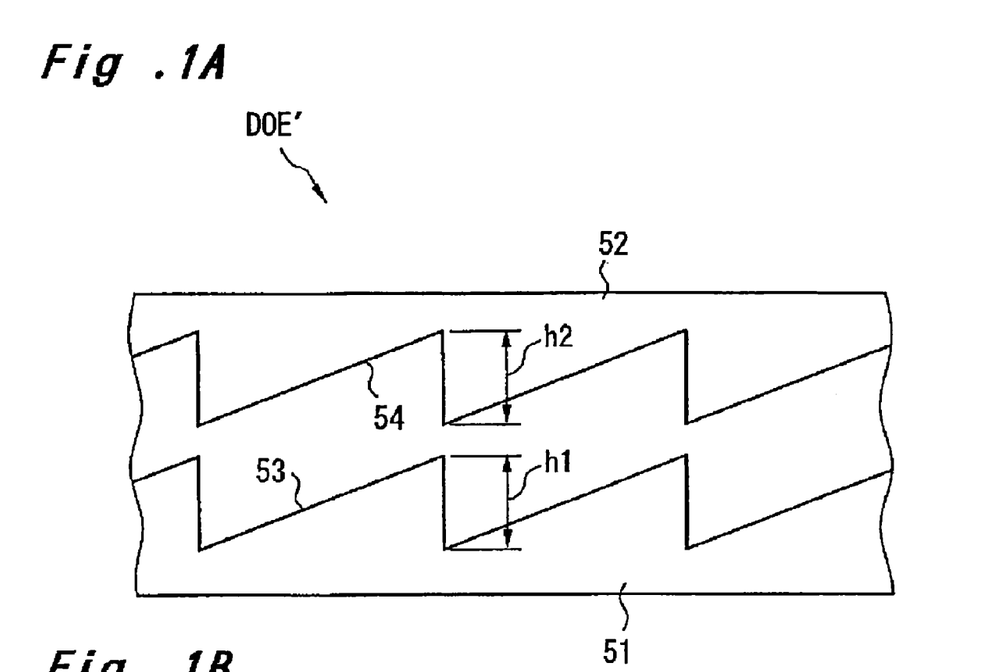

Concerning structure, the multi-layer diffractive optical element is comprised of a first optical element 51 made from a first material and a second optical element 52 made from a second material of which refractive index and dispersion value are different from those of the first optical element 51, as shown in FIG. 1(*a*), and the surfaces of the optical elements 51 and 52 which face each other are formed to be saw tooth. Then the height h1 of the relief pattern of the first optical element 51 is determined to be a predetermined value, and then height h2 of the relief pattern of the second optical element 52 is determined to be a different predetermined value, so as to satisfy the achromatic condition for a predetermined two wavelengths. Thereby the diffraction efficiency for the predetermined two wavelengths becomes 1.0, and the quite high diffraction efficiency can also be implemented for other wavelengths. The diffraction efficiency means ratio of intensity $I_0$ of the light which enters the diffractive optics and intensity $I_1$ of the primary diffracted light, that is $\eta(=I_1/I_0)$ in a transmission type diffractive optics.

In the case of non-contact multi-layer diffractive optics DOE' shown in FIG. 1(*a*), the first optical element 51 and the second optical element 52 constituting the diffractive optics DOE' have relief patterns 53 and 54 of which heights h1 and h2 are different from each other, so a plurality of dies are required, and the first and second optical elements 51 and 52 must be individually manufactured using these dies, and must be accurately aligned, therefore production takes an enormous amount of time.

Figure 1B:
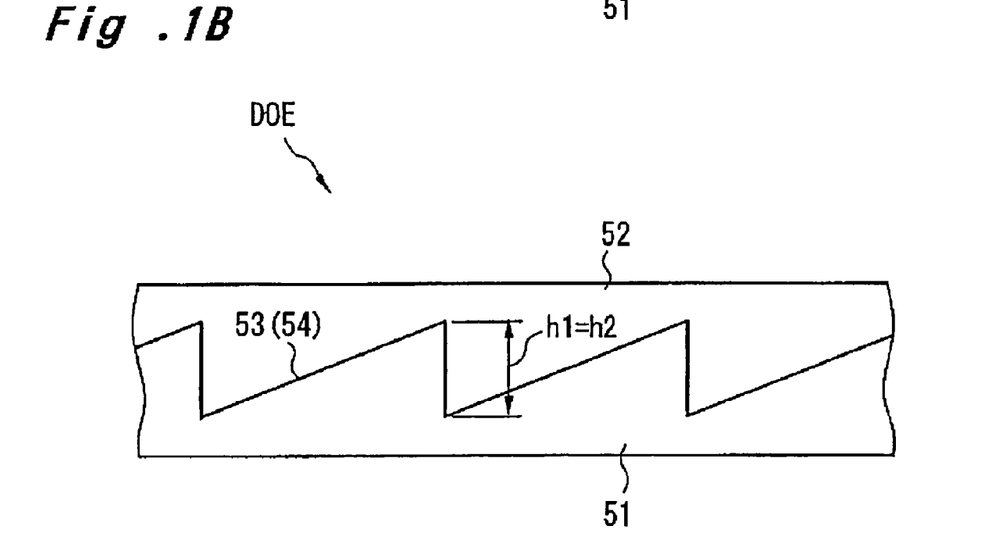

To prevent this, a contact multi-layer diffractive optics DOE, where the height h1 of the relief pattern 53 of the first optical element 51 and the height h2 of the relief pattern 54 of the second optical element 52 are matched, is being proposed (see FIG. 1(*b*)). This contact diffractive optics DOE has a configuration in which the second optical element 52 is bonded on the surface of the first optical element 51 where the relief pattern 53 is formed, and compared with the non-contact type, manufacturing is easier, such as the error sensitivity (tolerance) of the height of the diffraction grating is less strict, and the error sensitivity (tolerance) of the surface roughness on the grating surface is less strict, therefore the contact type diffractive optics excels in productivity and mass producibility. This means that the contact type diffractive optics has an advantage in decreasing cost of optical products. By using a contact multi-layer type configuration for the diffractive optics, the diffractive optics can be used for roughly the entirety of wavelengths, and can easily be used for a camera lens of a camera which utilizes white light in a wide band, or for an eye piece which is used in a visible light range.

The present invention relates to a compact and light weight optical system using this contact multi-layer diffractive optics. The optical system of the present embodiment is comprised of a first lens and a second lens having a positive refractive power which are disposed in order from an object, and a contact multi-layer diffractive optics is formed on an optical surface of the first lens or the second lens. Thereby a compact and high performance optical system, which has good optical characteristics in the entire area of wavelengths in use, can be implemented. This optical system can also be used as a camera lens optical system, and can also be used as a projection optical system by installing a display element near the image surface.

It is preferable to dispose the contact multi-layer diffractive optics on the surface of the first lens facing the object side. Then the light from the object enters the relief pattern of the contact multi-layer diffractive optics roughly vertically. Therefore the generation of stray light, due to oblique rays which did not enter at a normal angle at the step difference portion of the relief pattern, can be decreased. Also the diffractive optics positioned closest to the object is the contact type, so the stray light, other than lights which transmit through the relief pattern reflected by the lens surface and lens barrel, and affecting the image plane, can be decreased.

If the entire diffractive optics has a positive refractive power, it is preferable that the first optical element has a positive refractive power, but the second optical element may have a positive or negative refractive power. These optical elements can be constructed according to the design requirements, so that specification implementation and aberration correction becomes easier. If the diffractive optical surface has a positive refractive power, negative dispersion is generated, so good achromatism can be implemented in the entire diffractive optics.

The optical elements constituting the contact multi-layer diffractive optics must be made from a material having a relatively high refractive index and low dispersion, and a material having a relatively low refractive index and high dispersion, and it does not matter which optical element is closer to the object. Specifically it is necessary that the first optical element 51 (see FIG. 1(*b*)) is formed using one of the material having the high refractive index and low dispersion, and the material having the low refractive index and high dispersion, and the second optical element 52 (see FIG. 1(*b*)) is formed using the other material, and this is an essential configuration requirement to form the contact multi-layer diffractive optics. In order to decrease error sensitivity in manufacturing, the difference of refractive indexes on a d-line between the first optical element 51 and the second optical element 52 is preferably 0.45 or less, and is more preferably 0.2 or less.

According to the present embodiment, the condition given by the following conditional expression (1) is satisfied, $$0.002 < D/f < 2.0 \quad (1)$$

where D is an air distance on the optical axis between the first lens and the second lens, and f is a focal length of the entire optical system.

The conditional expression (1) specifies an appropriate range of the air distance D between the first lens and the second lens by a ratio with the focal length f. If this conditional expression (1) is satisfied, an optical system having good optical characteristics can be implemented even if the overall length is short. If D/f exceeds the upper limit of the conditional expression (1), the overall length of the optical system becomes too long, which makes it difficult to implement compactness and increases the generation of axial aberrations, so good image formation performance cannot be implemented. In particular, coma aberration of the rays above the principal ray increases and distortion to the + side tends to generate easily.

If D/f is less than the lower limit of the conditional expression (1), the eye pupil position of the optical system becomes too close, and tends to deviate from the condition to enter near the telecentric area of an image sensing element, for example. In this case, shading is easily generated as the image height is higher. Also correction of coma aberration tends to be insufficient, and sufficient image forming performance cannot be implemented. In the conditional expression (1), it is preferable that the upper limit of D/f is 1.0, and the lower limit thereof is 0.003.

In the conditional expression (1), it is more preferable that the upper limit of D/f is 0.1, and the lower limit thereof is 0.003.

In this case, it is also preferable that at least one optical surface of the first lens and the second lens is aspherical. By this, various aberrations, such as axial aberration, can be well corrected even if the contact multi-layer diffractive optics is used, and the overall length of the optical system is decreased.

The focal length f of the entire optical system is calculated by the following expression (21), as a composite focal length of the thin lens systems using the following expression (21), where f1 is the focal length of the first lens and f2 is a focal length of the second lens. The expression (21) can be transformed to be the expression (22).

$$1/f = (1/f1) + (1/f2) - D/(f1 \times f2) \quad (21)$$

$$D/(f1 \times f2) = \{(1/f1) + (1/f2)\} - 1/f \quad (22)$$

Based on expression (22), if f1>0 and f2>0, it is preferable to satisfy the condition given by the following conditional expression (2).

$$0 < D/(f1 \times f2) < 0.15 \quad (2)$$

The conditional expression (2) shows that sufficient refractive power for the entire optical system can be obtained by decreasing the distance of the first lens and the second lens with respect to the predetermined values of f1 and f2, if the value of D/(f1×f2) is small enough to be roughly zero. Thereby an optical system (e.g. eye piece) having large refractive power, of which overall length is decreased by decreasing the distance between the lenses, can be implemented.

If D/(f1×f2) exceeds the upper limit of the conditional expression (2), the refractive power of the entire optical system weakens, and sufficient refractive power (magnification) cannot be obtained. Also the distance between the lens and the image plane becomes too short, and it becomes difficult to arrange the mirror and prism. Also the distortion to the − side increases too much, and good images cannot be obtained. If the lenses contact, the interference fringe enters near the optical axis and the lens surfaces are scratched, so the lower limit of D/(f1×f2) should be 0. In the conditional expression (2), it is preferable that the upper limit of D/(f1×f2) is 0.1.

If f1<0 and f2>0, and |f1|>|f2|, it is preferable to satisfy the condition given by the following conditional expression (3).

$$-0.1 < D/(f1 \times f2) < 0 \quad (3)$$

If the first lens has a negative refractive power and the second lens has a positive refractive power, an achromatic function is generated by the lenses, so the pitch of the relief pattern to implement a predetermined achromatism can be lower. This decreases the generation of flares and makes it easier to manufacture diffractive optics, but decreasing the distance of the lenses decreases the refractive power. The conditional expression (3) shows an appropriate balance of the overall length, refractive power and aberrations of the optical system.

If D/(f1×f2) exceeds the lower limit of the conditional expression (3), the distance between the lenses increases, which increases the overall length and makes it impossible to implement a compact optical system. The distortion to the + side also increases too much, and good images cannot be obtained. If the lenses contact, the interference fringe enters near the optical axis and lens surfaces are scratched, so the upper limit of D/(f1×f2) should be 0. In the conditional expression (3), it is even more preferable that the upper limit of D/(f1×f2) is −0.01.

It is preferable to satisfy the condition given by the following conditional expression (4), $$50 < \Delta vd/\Delta nd < 2000 \quad (4)$$

where $\Delta vd$ is a difference of the Abbe numbers between the first optical element 51 and the second optical element 52, and $\Delta nd$ is a difference of the refractive indexes on the d-line between the first optical element 51 and the second optical element 52.

The conditional expression (4) specifies an appropriate range of the difference $\Delta vd$ of the Abbe numbers and the difference $\Delta nd$ of the refractive indexes between the material having a high refractive index and low dispersion and the material having a low refractive index and high dispersion. If the range specified by the conditional expression (4) is deviated from, the height of the relief pattern increases or the diffraction efficiency, with respect to various wavelengths, drops, even if the contact multi-layer diffractive optics is made from a material having a high refractive index and low dispersion and a material having low refractive index and high dispersion. In the conditional expression (4), it is preferable that the upper limit of $\Delta vd/\Delta nd$ is 800, and the lower limit thereof is 100.

It is preferable to satisfy the condition given by the following conditional expression (5), $$(Eg + EC)/2 > 0.9 \times Ed \quad (5)$$

where Ed is a diffraction efficiency of the contact multi-layer diffractive optics on the d-line, Eg is a diffraction efficiency of the contact multi-layer diffractive optics on the g-line, and EC is a diffraction efficiency of the contact multi-layer diffractive optics on the C-line.

The conditional expression (5) specifies an appropriate range of the diffraction efficiency in the wavelengths of a broadband. If the range specified by the conditional expression (5) is deviated from, the diffraction efficiency in either short wavelengths or long wavelengths drops, which increases diffraction flares and diminishes image quality. Specifically, a diffraction flare of blue increases if Eg drops, and a diffraction flare of red increases if EC drops, and both diminish the image quality. In the conditional expression (5), it is preferable that the coefficient related to Ed is set to the 0.8 to 0.98 range, where the value 0.9 is a value based on the experience of many individuals using a sample extraction.

If the contact multi-layer diffractive optics, which is disposed on an optical surface of the first lens or the second lens, is symmetric with respect to the optical axis, and has a diffractive optical surface (relief pattern) where the incident angle of the outermost ray (principal ray) is 10 degrees or less, it is preferable to satisfy the condition given by the following conditional expression (6)

$$0.1 < C/f < 3.0 \qquad (6)$$

where C is an effective diameter of the diffractive optical surface, and f is a focal distance of the entire optical system.

The conditional expression (6) specifies an appropriate range of an effective diameter of the diffractive optical surface. If C/f exceeds the upper limit of the conditional expression (6), the effective diameter becomes too large, which makes manufacturing of the diffractive optical surface (relief pattern) difficult, and increases cost. Also destructive light easily enters the diffractive optical surface from the outside, which tends to cause a drop in image quality due to flares. If C/f exceeds the lower limit of the conditional expression (6), on the other hand, the effective diameter of the lens on which the diffractive optical surface is formed becomes small, and the pitch of the relief pattern decreases, which not only makes manufacturing of the diffractive optical surface (relief pattern) difficult and increases the cost, but also generates flares on the diffractive optical surface and drops image quality. In the conditional expression (6), it is even more preferable that the upper limit of C/f is 0.8, and the lower limit thereof is 0.1

If the surface of the first lens facing the object is a concave surface, the surface of the first lens facing the opposite of the object side is a convex surface, and the contact multi-layer diffractive optics is formed on one of these surfaces, it is preferable to satisfy the following conditional expression (7), $$0.05 < h/d < 2.0 \qquad (7)$$

where h is the height of the relief pattern, and d is a smaller one of the thickness of the first optical element on the optical axis and the thickness of the second optical element on the optical axis.

The conditional expression (7) shows a relationship between an appropriate height h and thickness d of the optical element when a relief pattern, of which groove height is low, is formed. If h/d exceeds the upper limit of the conditional expression (7), the height of the groove becomes relatively too high, which not only makes it difficult to form the relief pattern, but also increases the step difference of the groove, and easily generates stray light due to the scattering of the light contacting this step difference portion. If h/d is lower than the lower limit of the conditional expression (7), on the other hand, the optical elements becomes relatively too thick, which not only makes it difficult to form the relief pattern, but also increases the internal absorption of the light in the optical elements, and drops the image quality due to the drop in transmittance of the entire optical system and achromatism. In the conditional expression (7), the upper limit of h/d may be 1.0, and the lower limit thereof 0.02.

It is also preferable to satisfy the condition given by the following conditional expression (8), $$0.0001 < p/f < 0.003 \qquad (8)$$

where p is a minimum pitch of the relief pattern, and f is a focal length of the entire optical system.

The conditional expression (8) specifies an appropriate ratio of the minimum pitch p and the focal length f of the entire optical system. If the minimum pitch p is small, the angle of diffraction becomes large, and the color dispersion of the diffractive optical surface increases, which is effective for correcting chromatic aberration, but makes processing difficult and increases the generation of flares on the diffractive optical surface. Therefore it is important to set the minimum pitch p in an appropriate range.

If p/f exceeds the upper limit of the conditional expression (8), the minimum pitch p becomes too large, and sufficient achromatism cannot be implemented, and image quality drops. If p/f exceeds the lower limit of the conditional expression (8), the minimum pitch p becomes too small, and as mentioned above, processing becomes difficult, and flares on the diffractive optical surface are generated more frequently. Unnecessary flare light drops the image quality and drops the diffraction efficiency as well.

When an image formed using a compact display or an objective lens is enlarged and observed, as an application of the optical system of the present embodiment, it is preferable to satisfy the condition given by the following conditional expression (9), $$0.1 < \phi \times R/f^2 < 2.0 \qquad (9)$$

where f is a focal length of the entire optical system, $\phi$ is a pupil diameter, and R is an eye relief.

The conditional expression (9) shows an appropriate relationship of the pupil diameter $\phi$, eye relief R and focal length f when the optical system of the present embodiment is applied to the above mentioned observation optical system. Securing sufficient eye relief R is critical to construct an observation optical system.

If $\phi \times R/f^2$ exceeds the upper limit of the conditional expression (9), the eye relief R becomes too long, which increases the size of the optical system. If $\phi \times R/f^2$ is lower than the lower limit of the conditional expression (9), on the other hand, the eye relief R becomes too short, which makes observation difficult. The pupil diameter $\phi$ also decreases, so an eclipse tends to occur, and observation of an image becomes difficult when the optical system is used. The shape of the pupil need not be circular, but may be rectangular or elliptic according to the application or design specification. This shape of the pupil can be implemented by considering the shape of the lens and shape of the stop. In the conditional expression (9), it is preferable that the upper limit of $\phi \times R/f^2$ is 1.0 and the lower limit thereof is 0.15. Also in the conditional expression (9), it is more preferable that the upper limit of $\phi \times R/f^2$ is 1.0 and the lower limit thereof is 0.2. It is even more preferable that $\phi \times R/f^2$ is around 0.3.

When the optical system of the present embodiment is actually constructed, it is more preferable to satisfy the following conditions.

First to maintain good moldability and to insure excellent mass producibility for the first and second optical elements, it is preferable that a viscosity (viscosity of uncured material) of a material constituting one of the optical element is at least 40 Pa·s (pascal-second) or more. If this viscosity is 40 Pa·s or less, resin tends to flow during molding, making precise shape formation difficult. However the viscosity of a material constituting the other optical element is 2000 Pa·s or more.

In order to improve the production efficiency, it is preferable that the first and second optical elements are both formed using UV curable resin. Thereby the man hours can be decreased and cost can be decreased.

If the materials of the first and second optical elements are both resin, as mentioned above, it is preferable that the specific gravities of these resins are both 2.0 or less to decrease size and weight. Resin, which has a lower specific gravity than glass, is very useful for decreasing the weight of the optical system. To be even more effective, the specific gravity is more preferably 1.6 or less. The first and second optical elements have a refractive surface that have positive refractive power on the interface with air, and this refractive surface is preferably aspherical.

It is also possible to mix dye in one of the resins of the first and second optical elements, so as to provide a color filter effect. For example, an infrared cut filter may be constructed by this method, whereby a compact image sensing optical system may be implemented.

The stop can be disposed at an arbitrary location in the optical system, but it is preferable to construct a stop so as to cut unnecessary rays and transmit only rays that are useful for image formation. For example, the lens frame itself may be used as an aperture stop, or the stop may be constructed using a mechanical element at a position distant from the lens. The shape of the stop is not limited to a circle, but may be rectangular or elliptic, according to the design specification.

If the optical system of the present embodiment is used for a photographic optical system, an optical low pass filter may be included inside or outside the contact multi-layer diffractive optics.

If the optical system of the present embodiment is used for an observation optical system, it is preferable that the magnification of the magnifying glass thereof is ×2 or more, ×20 or less.

An optical system comprised of three or more (plurality of) composing elements where the contact multi-layer diffractive optics is enclosed is not outside the scope of the present invention. An optical system in which a refractive index distributed lens, a crystal material lens or the like, is also within the scope of the present invention.

It is also preferable to satisfy the condition given by the following conditional expression (10), $$0.001 < \Delta/f < 0.02 \tag{10}$$

where Δ is the maximum spread width of a d-line, g-line, C-line or F-line in the axial chromatic aberration.

The conditional expression (10) specifies the condition of an appropriate correction range of the axial chromatic aberration. If Δ/f exceeds the upper limit of the conditional expression (10), the axial chromatic aberration increases too much, which colors the image and diminishes the image quality considerably. In the conditional expression (10), it is more preferable that the upper limit of Δ/f is 0.003, and the lower limit thereof is 0.002.

EXAMPLES

Each example of the present invention will now be described with reference to the accompanying drawings. In each example, the phase difference of the diffractive optical surface is calculated by an ultra high refractive index method using a regular refractive index and the later mentioned aspherical expressions (23) and (24). The ultra high refractive index method uses a predetermined equivalent relationship between the aspherical shape and grating pitch on the diffractive optical surface, and in the present examples, the diffractive optical surface is shown by the data of the ultra high refractive index method, that is, by the later mentioned aspherical expressions (23) and (24), and the coefficients thereof. In the present example, the calculation targets of the aberration characteristic are d-line (wavelength: 587.6 nm, refractive index: 10001), C-line (wavelength: 656.3 nm, refractive index: 11170.4255), F-line (wavelength: 486.1 nm, refractive index: 8274.7311) and g-line (wavelength: 435.8 nm, refractive index 7418.6853).

In each example, the aspherical surface is given by the following conditional expressions (23) and (24), $$S(y) = (y^2/r)/(1 + (1 - \kappa \cdot y^2/r^2)^{1/2}) + C_2 y^2 + C_4 y^4 + C_6 y^6 + C_8 y^8 + C_{10} y^{10} \tag{23}$$

$$R = 1/\{(1/r) + 2C_2\} \tag{24}$$

where y is the height in a direction vertical to the optical axis, S(y) is a distance (sag amount) from the tangential plane at a vertex of the aspherical surface to a position on the aspherical surface at the height y along the optical axis, r is a radius of curvature of the reference spherical surface, R is a paraxial radius of curvature, κ is a conical coefficient, and $C_n$ is an aspherical coefficient of degree n.

In each example, * is indicated at the right side of the surface number in the table if the lens surface is aspherical. In each example, the phase difference of the diffractive optical surface is calculated by the ultra refractive index method using the regular refractive index and the above mentioned aspherical expressions (23) and (24). Therefore the aspherical expressions (23) and (24) are used for both the aspherical lens surface and the diffractive optical surface, but the aspherical expressions (23) and (24) used for the aspherical lens surface show the aspherical shape of the lens surface itself, while the aspherical expressions (23) and (24) used for the diffractive optical surface show the performance of the diffractive optical surface.

Example 1

Figure 2:
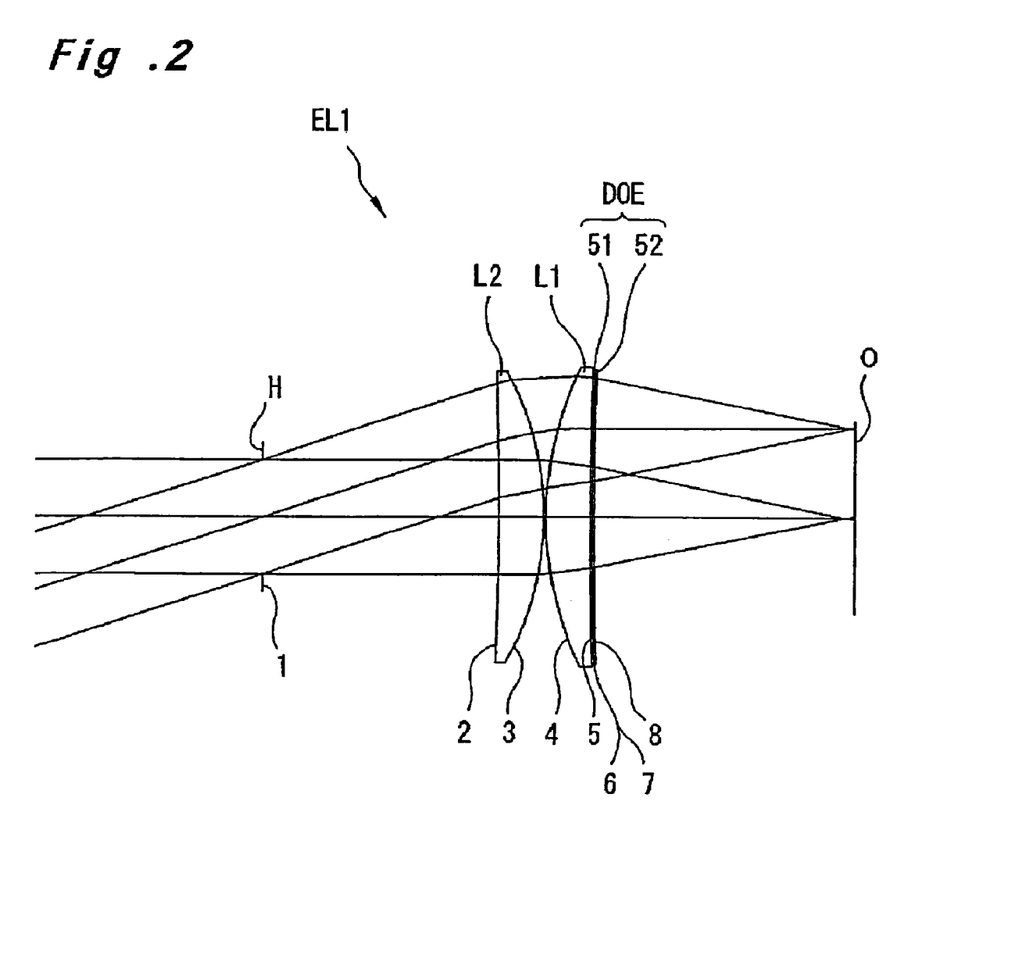
FIG. 2 is a diagram depicting a configuration of an optical system according to Example 1.

Now Example 1 of the present invention will be described with reference to FIG. 2 to FIG. 4. The optical system of each example is used as an eye piece to observe an image of an object. As FIG. 2 shows, an optical system (eye piece) EL1 of Example 1 is comprised of a first lens L1 having a positive refractive power and a second lens L2 having a positive refractive power, which are disposed in order from an object O, and a contact multi-layer diffractive optics DOE is glued on a surface of the first lens L1 facing the object O. In FIG. 2, an exit pupil is indicated by the symbol H. The object O is a liquid crystal display device, for example, and an image displayed on the liquid crystal display device is enlarged and observed using the optical system (eye piece) EL1 of the present example. The full angle of view of this optical system (eye piece) EL1 is 35.4 degrees.

The contact multi-layer diffractive optics DOE is comprised of a first optical element 51 and a second optical element 52 in order from the side glued to the first lens L1. The surface of the first lens L1 facing the object O is a concave surface having a slight curvature, and the surface of the first lens L1 positioned opposite the object O side (surface facing the second lens L2) is a convex surface. The surface of the second lens L2 facing the first lens L1 is a convex surface, and the surface of the second lens L2 positioned opposite the first lens L1 side is a concave surface.

In the present example, materials of the first and second lenses L1 and L2 are both Zeonex 480R, made by Zeon Corp., where the material of the first optical element 51 is an ultraviolet curable resin having a relatively low refractive index and high dispersion, and the material of the second optical element 52 is an ultraviolet curable resin having a relatively high refractive index and low dispersion, which will be described below.

The above mentioned ultraviolet curable resin having a relatively low refractive index and high dispersion is an ultraviolet curable composite generated by mixing 2,2,3,3,4,4,5,5-octaflu-ohexane-1,6-di-acrylate, 9,9-bis[4-(2-acryloyloxyethoxy) phenyl]fluorene, and Irgacure 184, and performing a predetermined operation. Hereafter this resin is called low refractive index resin No. 1. The ultraviolet curable resin having a relatively high refractive index and low dispersion is an ultraviolet curable composite generated by performing an additional reaction of tricyclodecane-dimethanol diacrylate and di(2-mercapto diethyl)sulfide, then adding Irgacure 184. Hereafter this resin is called high refractive index resin No. 1.

Table 1 below shows the parameters of each lens according to Example 1. In Table 1, the surface numbers 1 to 8 correspond to the surfaces 1 to 8 in FIG. 2. The first surface is a pupil surface. r in Table 1 is a radius of curvature of the lens surface (radius of curvature of a reference spherical surface in the case of an aspherical surface), d is a distance of lens surfaces, n(d) is a refractive index on d-line, n(g) is a refractive index on g-line, n(C) is a refractive index on C-line, and n(F) is a refractive index on F-line. The values corresponding to the above mentioned conditional expressions (1) to (10) (excluding the conditional expression (3)), that is the conditional correspondence values, are also shown below. In the following parameter values, "mm" is normally used as a unit for the radius of curvature r, surface distance d and other lengths, unless otherwise specified, however a similar optical performance can be acquired even if the optical system is proportionally expanded or reduced, so unit is not limited to "mm", but another appropriate unit can also be used. The above description on the tables is the same for other examples.

In Table 1, * is indicated at the right side of the surface number if the lens surface is aspherical. In the present example, surfaces corresponding to the surface numbers 3 and 7 are aspherical, and a surface corresponding to the surface number 6 is a diffractive optical surface. The diffractive optical surface is represented by a combination of an ultra high refractive index value, such as n(d)=10001, and an aspherical surface coefficient.

TABLE 1

| Surface number | r | d | n(d) | n(g) | n(C) | n(F) |
|---|---|---|---|---|---|---|
| 1 | 0.00000 | 21.00000 | 1.000000 | | | |
| 2 | −300.00000 | 4.00000 | 1.524700 | 1.536490 | 1.521960 | 1.531290 |
| 3* | −26.22573 | 0.20000 | 1.000000 | | | |
| 4 | 28.31486 | 4.00000 | 1.524700 | 1.536490 | 1.521960 | 1.531290 |
| 5 | 297.99863 | 0.20000 | 1.527600 | 1.547700 | 1.523300 | 1.538500 |
| 6* | 297.99863 | 0.00000 | 10001 | 7418.6853 | 11170.4255 | 8274.7311 |
| 7* | 297.99863 | 0.20000 | 1.556900 | 1.571100 | 1.553700 | 1.564800 |
| 8 | 297.99863 | 23.07811 | 1.000000 | | | |

(Aspherical data)

| Surface number | κ | $C_2$ | $C_4$ | $C_6$ | $C_8$ | $C_{10}$ |
|---|---|---|---|---|---|---|
| 3 | 0.4700 | 0.00000 | $-8.00000 \times 10^{-6}$ | $1.38460 \times 10^{-9}$ | $2.00000 \times 10^{-12}$ | 0.00000 |
| 7 | 1.0000 | $-1.90000 \times 10^{-7}$ | $3.00000 \times 10^{-10}$ | 0.00000 | 0.00000 | 0.00000 |

(Conditional correspondence values)
D = 0.2
f = 25.812
f1 = 48.847
f2 = 54.496
Δvd = 15.46
Δnd = 0.0293
Eg = 98.221
EC = 98.233
Ed = 99.999
C = 24.19
h = 0.02
d = 0.2
p = 0.0238
φ = 10.000
r = 21.000
Δ = 0.1873
(1) D/f = 0.00775
(2) D/(f1 × f2) = 0.0000751
(4) Δvd/Δnd = 527.645
(5) (Eg + EC)/2 = 98.227  0.9 × Ed = 89.999
(6) C/f = 0.937
(7) h/d = 0.1
(8) p/f = 0.000922
(9) φ × R/f² = 0.3152
(10) Δ/f = 0.00726

As the above table shows, the present example satisfies all the conditional expressions (1) to (10) (excluding the conditional expression (3)).

Figure 3:
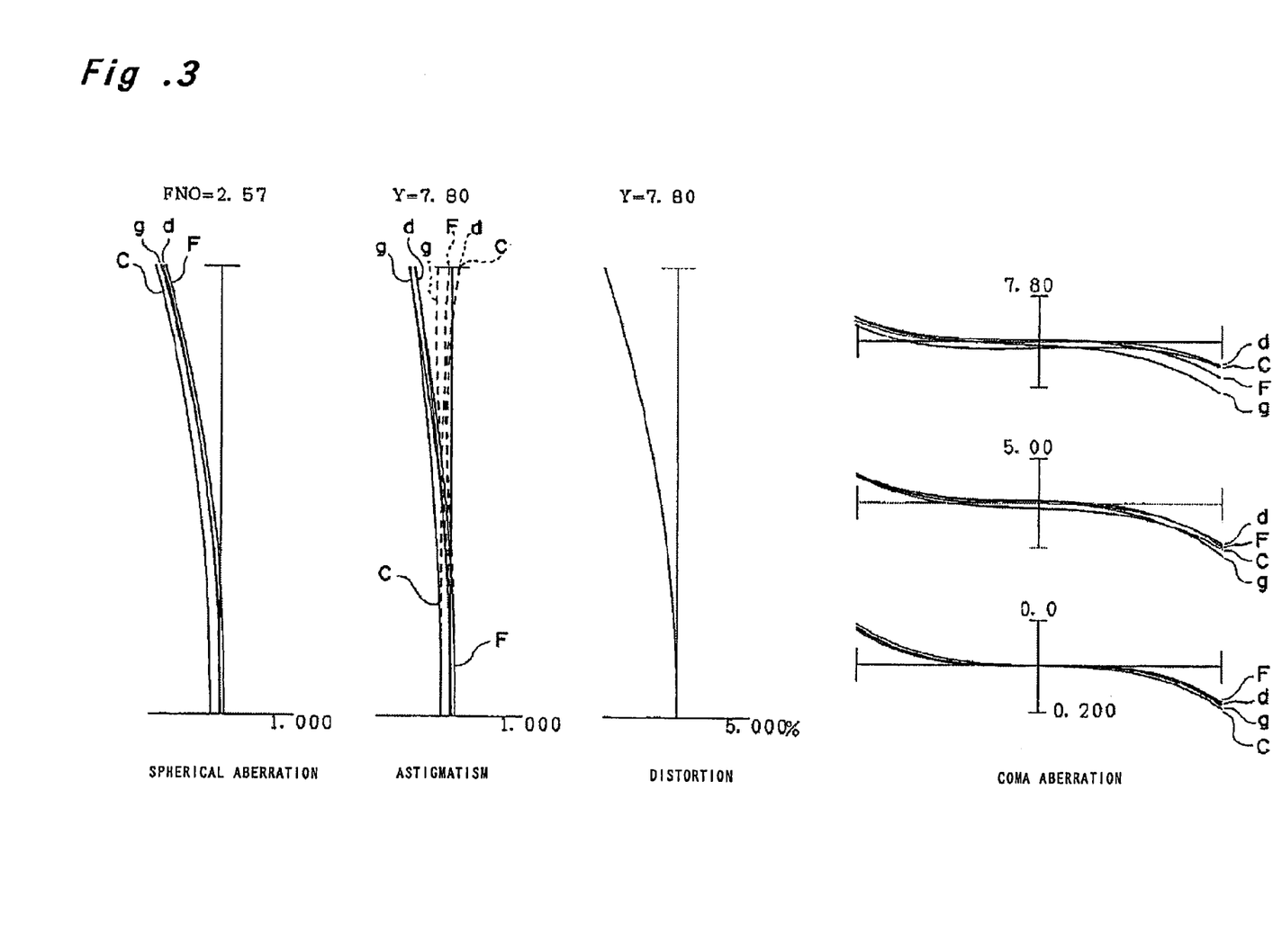
FIG. 3 are graphs showing various aberrations of the optical system according to Example 1.

FIG. 3 are graphs showing various aberrations according to Example 1. Each graph shows the result of aberrations on d-line, g-line, C-line and F-line, where FNO is an F number, and Y is an image height. In the graph of the spherical aberration, a value of the F number corresponding to the maximum aperture is shown, in the graphs of the astigmatism and distortion, the maximum values of the image height are shown respectively, and in the graph of the coma aberration, the value of each image height is shown. In the graph showing astigmatism, the solid line indicates a sagittal image surface, and the broken line indicates a meridional image surface. The above description of the graphs showing aberrations is the same for other examples. As each of the graphs showing aberrations clarifies, according to the present example, various aberrations are well corrected, and excellent image formation performance is implemented not only for d-line, but also for g-line, C-line and F-line.

Figure 4:
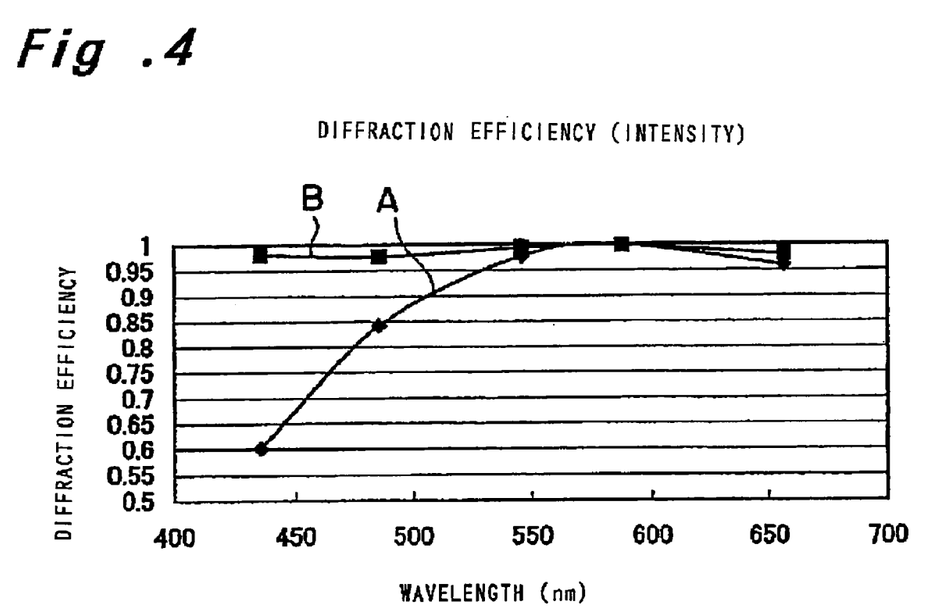
FIG. 4 is a graph showing a diffraction efficiency of the contact multi-layer diffractive optics with respect to each wavelength.

The curves A and B in FIG. 4 show the distribution of the diffraction efficiency when it is set that the diffraction efficiency on d-line is 100%, where the curve A shows the diffraction efficiency in a single layer diffractive optics in which a relief pattern is formed on the surface of the low refractive index resin No. 1, and the curve B shows the diffraction efficiency in the contact multi-layer diffractive optics formed by the low refractive index resin No. 1 and the high refractive index resin No. 1. In the present example, 0.95 (95%) or higher diffraction efficiency (light intensity) can be implemented in a wavelength area from g-line to C-line.

Example 2

Figure 5:
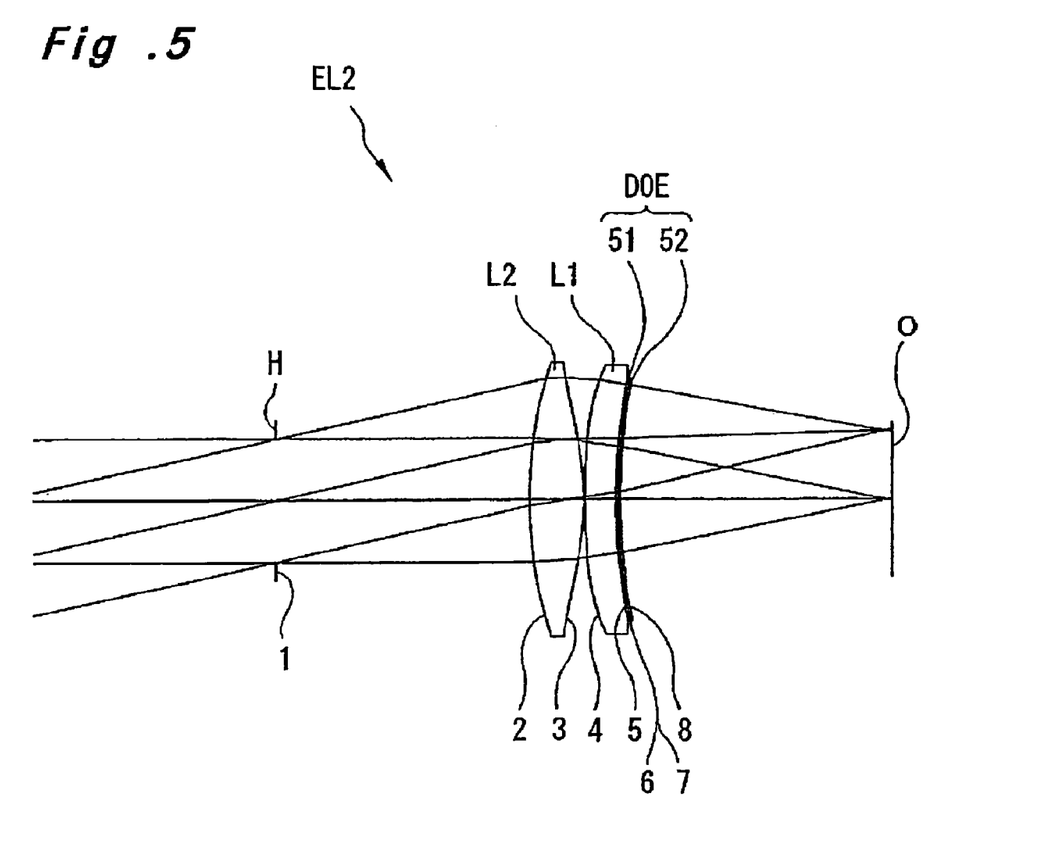
FIG. 5 is a diagram depicting a configuration of an optical system according to Example 2.

Example 2 will now be described with reference to FIG. 5 and FIG. 6. As FIG. 5 shows, an optical system (eye piece) EL2 of Example 2 is comprised of a first lens L1 having a negative refractive power and a second lens L2 having a positive refractive power, which are disposed in order from an object O, and a contact multi-layer diffractive optics DOE is glued on a surface of the first lens L1 facing the object O. In FIG. 5, an exit pupil is indicated by the symbol H. The full angle of view of this optical system (eye piece) EL2 is 24.3 degrees.

As FIG. 5 shows, the optical system (eye piece) EL2 of Example 2 has a similar configuration as the optical system EL1 of Example 1, so each composing element is denoted with a same symbol as Example 1, for which detailed description is omitted. A difference from Example 1 is that the first lens L1 has a negative refractive power. Another difference from Example 1 is that the surface of the second lens L2 positioned at the opposite side of the first lens L1 has a convex surface.

Table 2 shows the parameters of each lens according to Example 2. In Table 2, the surface numbers 1 to 8 correspond to the surfaces 1 to 8 in FIG. 5. In Table 2, * is indicated at the right side of the surface number if the lens surface is aspherical. In the present example, surfaces corresponding to the surface numbers 3, 4 and 7 are aspherical, and a surface corresponding to the surface number 6 is a diffractive optical surface. The diffractive optical surface is represented by the ultra high refractive index method, just like Example 1.

TABLE 2

| Surface number | r | d | n(d) | n(g) | n(C) | n(F) |
|---|---|---|---|---|---|---|
| 1 | 0.00000 | 21.00000 | 1.000000 | | | |
| 2 | 34.04256 | 4.60000 | 1.524700 | 1.536490 | 1.521960 | 1.531290 |
| 3* | −19.63227 | 0.10000 | 1.000000 | | | |
| 4* | 140.45480 | 2.50000 | 1.517420 | 1.529800 | 1.514440 | 1.524310 |
| 5 | 49.47642 | 0.20000 | 1.527600 | 1.547700 | 1.523300 | 1.538500 |
| 6* | 49.47642 | 0.00000 | 10001 | 7418.6853 | 11170.4255 | 8274.7311 |
| 7* | 49.47642 | 0.20000 | 1.556900 | 1.571100 | 1.553700 | 1.564800 |
| 8 | 49.47642 | 22.76128 | 1.000000 | | | |

(Aspherical data)

| Surface number | κ | $C_2$ | $C_4$ | $C_6$ | $C_8$ | $C_{10}$ |
|---|---|---|---|---|---|---|
| 3 | −1.7871 | 0.00000 | $1.78450 \times 10^{-4}$ | $-1.65830 \times 10^{-6}$ | $7.11790 \times 10^{-9}$ | $-6.18770 \times 10^{-12}$ |
| 4 | −6.5471 | 0.00000 | $1.86590 \times 10^{-4}$ | $-1.49880 \times 10^{-6}$ | $6.23320 \times 10^{-9}$ | $-2.70900 \times 10^{-12}$ |
| 7 | 1.0000 | $-1.50000 \times 10^{-7}$ | $7.68750 \times 10^{-11}$ | $-1.03410 \times 10^{-11}$ | $1.78730 \times 10^{-13}$ | $-9.74580 \times 10^{-16}$ |

(Conditional correspondence values)
D = 0.1
f = 26.335
f1 = −269.234
f2 = 24.452
Δvd = 15.46
Δnd = 0.0293
Eg = 98.221
EC = 98.233
Ed = 99.999
C = 18.71
h = 0.02
d = 0.2
p = 0.0305
φ = 10.000
r = 21.000
Δ = 0.1124
(1) D/f = 0.00380
(3) D/(f1 × f2) = −0.00001519
(4) Δvd/Δnd = 527.645
(5) (Eg + EC)/2 = 98.227  0.9 × Ed = 89.999
(6) C/f = 0.711
(7) h/d = 0.1
(8) p/f = 0.00116
(9) φ × R/f$^2$ = 0.3028
(10) Δ/f = 0.00427

As the above table shows, the present example satisfies all the conditional expressions (1) to (10) (excluding the conditional expression (2)).

Figure 6:
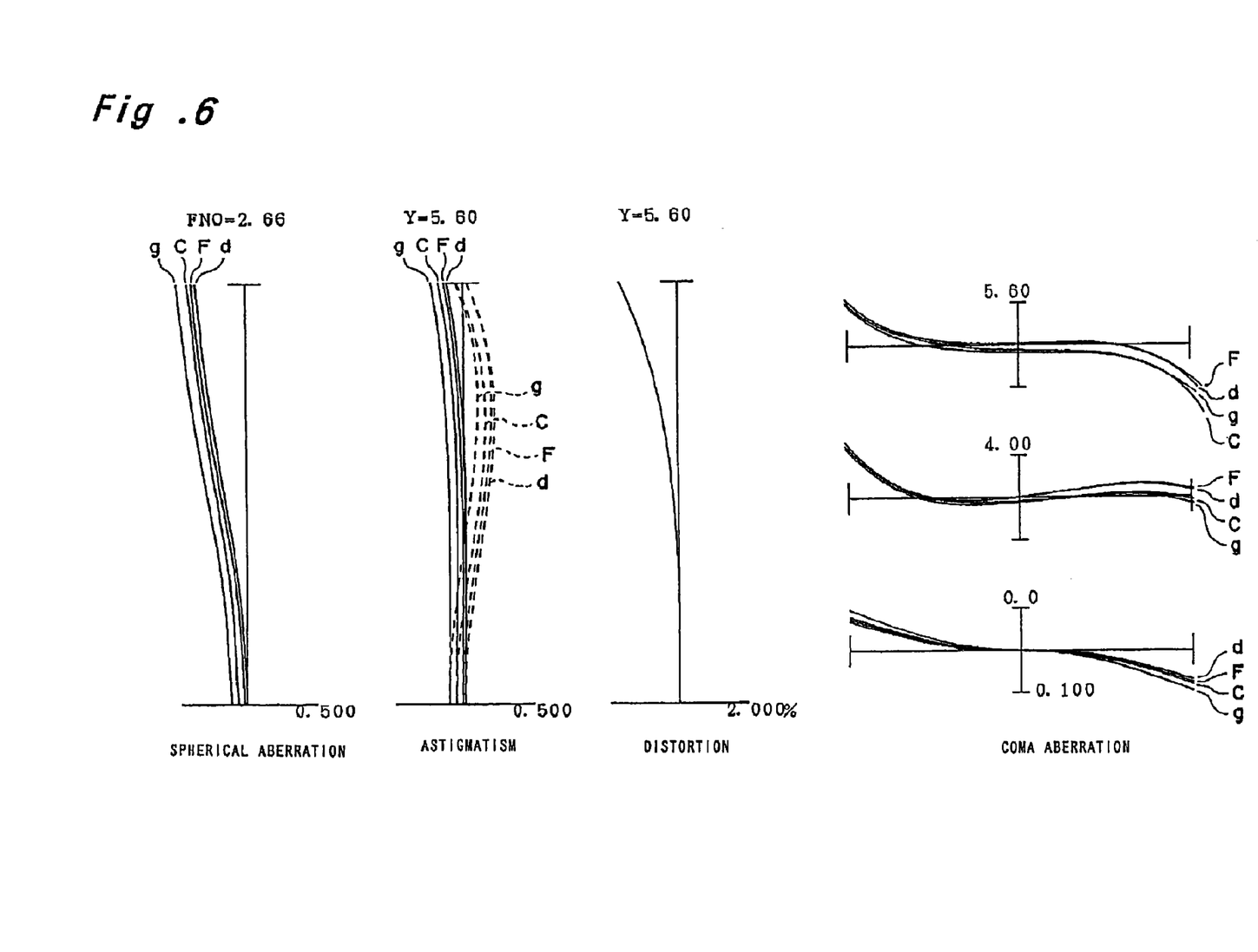
FIG. 6 are graphs showing various aberrations of the optical system according to Example 2.

FIG. 6 are graphs showing various aberrations according to Example 2. As each of the graphs showing aberrations clarifies, according to the present example, various aberrations are well corrected, and excellent image formation performance is implemented not only for d-line, but also for g-line, C-line and F-line.

Example 3

Figure 7:
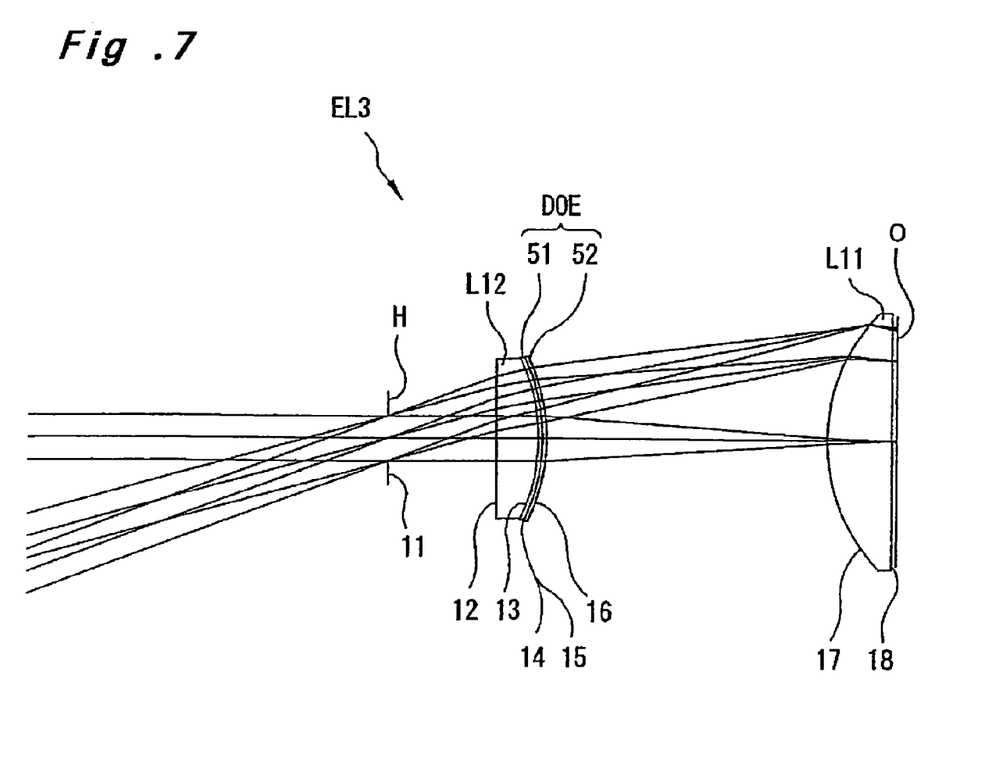
FIG. 7 is a diagram depicting a configuration of an optical system according to Example 3.

Example 3 will now be described with reference to FIG. 7 and FIG. 8. As FIG. 7 shows, an optical system (eye piece) EL3 of Example 3 is comprised of a first lens L11 having a positive refractive power, and a second lens L12 having a positive refractive power, which are disposed in order from an object O, and a contact multi-layer diffractive optics DOE is glued on a surface of the second lens L12 facing the first lens L11. In FIG. 7, the exit pupil is indicated by the symbol H. The full angle of view of this optical system (eye piece) EL3 is 40.0 degrees.

The contact multi-layer diffractive optics DOE is comprised of a first optical element 51 and a second optical element 52 in order from the side glued to the second lens L12. The surface of the first lens L11 facing the object O is a plane, and the surface of the first lens L11 positioned opposite of the object O side (surface facing the second lens L12) is a convex surface. The surface of the second lens L12 facing the first lens L11 is a convex surface, and the surface of the second lens L12 positioned opposite of the first lens L11 side is a plane.

In the present example, materials of the first and second lenses L11 and L12 are both acrylic resin, where the material of the first optical element 51 is an ultraviolet curable resin having a relatively high refractive index and low dispersion (just like the above mentioned Example 1), and the material of the second optical element 52 is an ultraviolet curable resin having a relatively low refractive index and high dispersion (just like the above mentioned Example 1).

Table 3 shows the parameters of each lens according to Example 3. In Table 3, the surface numbers 1 to 8 correspond to the surfaces 11 to 18 in FIG. 7. In Table 3, * is indicated at the right side of the surface number if the lens surface is aspherical. In the present example, a surface corresponding to the surface number 5 is aspherical, and a surface corresponding to the surface number 4 is a diffractive optical surface. The diffractive optical surface is represented by the ultra high refractive index method, just like Example 1.

TABLE 3

| Surface number | r | d | n(d) | n(g) | n(C) | n(F) |
|---|---|---|---|---|---|---|
| 1 | 0.00000 | 5.00000 | 1.000000 | | | |
| 2 | 0.00000 | 2.00000 | 1.491080 | 1.501900 | 1.488540 | 1.497070 |
| 3 | −8.20000 | 0.20000 | 1.556900 | 1.571100 | 1.553700 | 1.564800 |
| 4* | −8.20000 | 0.00000 | 10001 | 7418.6853 | 11170.4255 | 8274.7311 |
| 5* | −8.20000 | 0.20000 | 1.527600 | 1.547700 | 1.523300 | 1.538500 |
| 6 | −8.20000 | 13.00000 | 1.000000 | | | |
| 7 | 8.20000 | 3.00000 | 1.491080 | 1.501900 | 1.488540 | 1.497070 |
| 8 | 0.00000 | 0.20254 | 1.000000 | | | |

(Aspherical data)

| Surface number | κ | $C_2$ | $C_4$ | $C_6$ | $C_8$ | $C_{10}$ |
|---|---|---|---|---|---|---|
| 5 | 1.0000 | $-2.20000 \times 10^{-7}$ | $-2.00000 \times 10^{-9}$ | 0.00000 | 0.00000 | 0.00000 |

(Conditional correspondence values)
D = 13
f = 13.47645
f1 = 15.537
f2 = 16.698
Δvd = 15.46
Δnd = 0.0293
Eg = 98.221
EC = 98.233
Ed = 99.999
C = 6.38
h = 0.02
d = 0.2
p = 0.01203
φ = 10.000
r = 21.000
Δ = 0.0488
(1)D/f = 0.9646
(2)D/(f1 × f2) = 0.0501
(4)Δvd/Δnd = 527.645
(5)(Eg + EC)/2 = 98.227 0.9 × Ed = 89.999
(6)C/f = 0.4734
(7)h/d = 0.1
(8)p/f = 0.000893
(9)φ × R/f² = 1.1563
(10)Δ/f = 0.00362

As the above table shows, the present example satisfies all the conditional expression (1) to (10) (excluding the conditional expression (3)).

Figure 8:
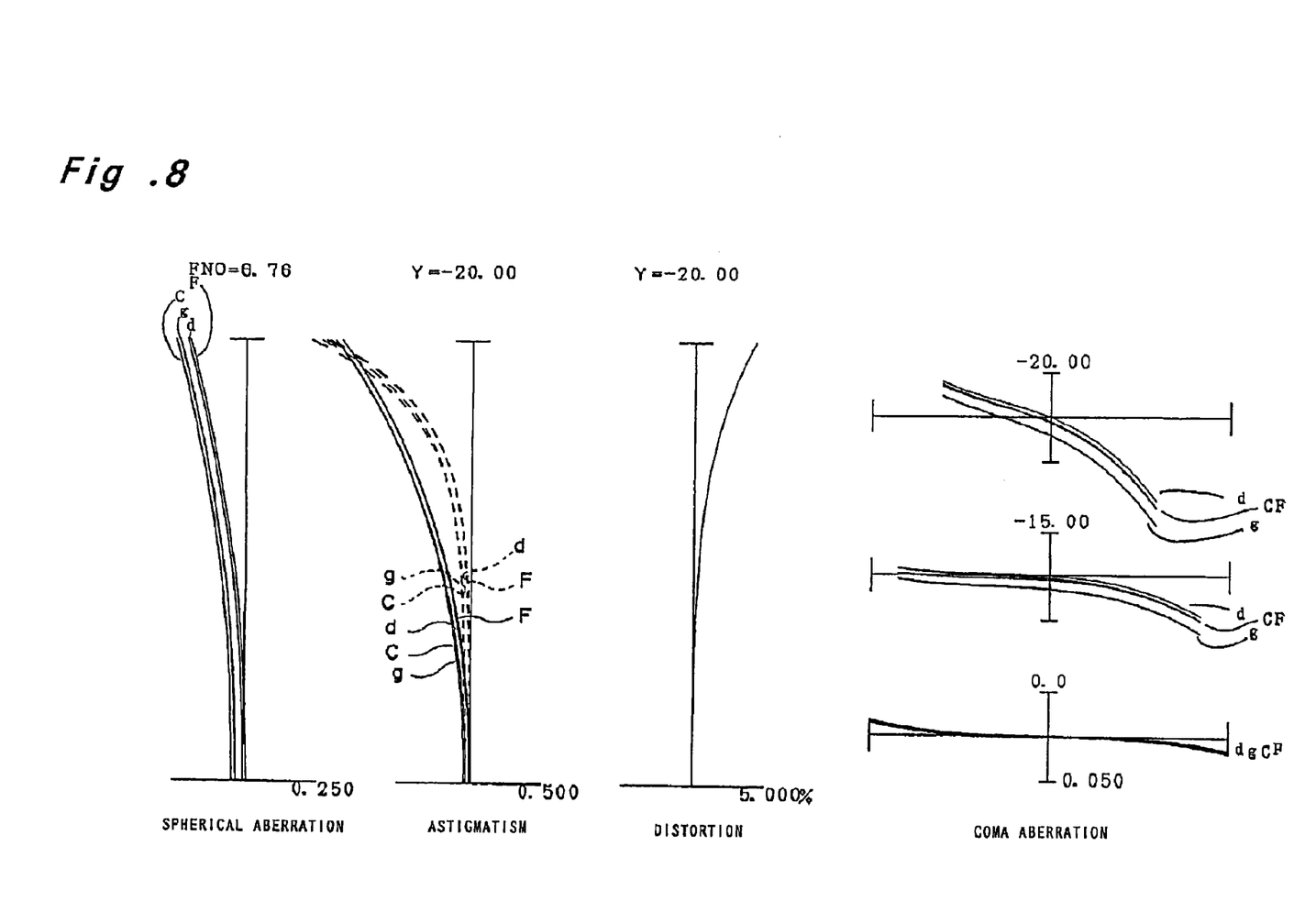
FIG. 8 are graphs showing various aberrations of the optical system according to Example 3.

FIG. 8 are graphs showing various aberrations according to Example 3. As each of the graphs showing aberrations clarifies, according to the present example, various aberrations are well corrected although not as well corrected as those in the abovementioned first and second examples, and excellent image formation performance is implemented not only for d-line, but also for g-line, C-line and F-line. In each example, the present inventor attempted to design the optical system under the condition of D/f≈0.003, but a major improvement of various aberrations was not implemented compared with prior art.

The present invention described above is not limited to the above embodiments, but can be improved appropriately within a scope that does not deviate from the spirit of the present invention. Each of the above mentioned examples described an example of the optical system used as an eye piece, but the optical system of the present invention is not limited to this, but may be used for a projection optical system as well. In the case of an eye piece, it is preferable to form a contact multi-layer diffractive optics on the lens at the object side, as seen in Examples 1 and 2. This is because flares decreases since the principal ray enters roughly vertically to the optical surface on which the relief pattern is formed.

What is claimed is:

1. An optical system comprising a first lens and a second lens having a positive refractive power, which are disposed in order from an object, characterized in that a contact multi-layer diffractive optics, which has a first optical element formed with a relief pattern and a second optical element, which is in contact with the surface of the first optical element where the relief pattern is formed, is disposed on an optical surface of the first lens or the second lens, and characterized in that the difference of refractive indexes on a d-line between the first optical element and the second optical element is 0.45 or less, and the following expression is satisfied:

$$0.002 < D/f < 2.0$$

where D is an air distance on an optical axis between the first lens and the second lens, and f is a focal length of the entire optical system.

2. The optical system according to claim 1, characterized in that the condition of the following expression is satisfied:

$$0 < D/(f1 \times f2) < 0.15$$

where f1 is a focal length of the first lens, f2 is a focal length of the second lens, and f1>0 and f2>0.

3. The optical system according to claim 1, characterized in that the condition of the following expression is satisfied:

$$-0.1 < D/(f1 \times f2) < 0$$

where f1 is a focal length of the first lens, f2 is a focal length of the second lens, and f1<0, f2>0 and |f1|>|f2|.

4. The optical system according to claim 1, characterized in that at least one optical surface of the first lens and the second lens is aspherical.

5. The optical system according to claim 1, characterized in that the contact multi-layer diffractive optics is formed on a surface of the first lens, the face facing the object.

6. The optical system according to claim 1, characterized in that the first optical element is formed using one of a material having a relatively high refractive index and low dispersion, and a material having a relatively low refractive index and high dispersion, and the second optical element is formed using the other one of the materials, and the condition of the following expression is satisfied:

$$50 < \Delta vd/\Delta nd < 2000$$

where $\Delta vd$ is a difference of Abbe numbers between the first optical element and the second optical element, and $\Delta nd$ is a difference of refractive indexes on a d-line between the first optical element and the second optical element.

7. The optical system according to claim 1, characterized in that the condition of the following expression is satisfied:

$$(Eg+EC)/2 > 0.9 \times Ed$$

where Ed is a diffraction efficiency of the contact multi-layer diffractive optics on a d-line, Eg is a diffraction efficiency of the contact multi-layer diffractive optics on a g-line, and EC is a diffraction efficiency of the contact multi-layer diffractive optics on a C-line.

8. The optical system according to claim 1, characterized in that the condition of the following expression is satisfied:

$$0.0001 < p/f < 0.003$$

where p is a minimum pitch of the relief pattern and f is a focal length of the entire optical system.

9. The optical system according to claim 1, characterized in that the condition of the following expression is satisfied:

$$0.1 < \phi \times R/f^2 < 2.0$$

where f is a focal length of the entire optical system, $\phi$ is a pupil diameter, and R is eye relief.

10. An eye piece for observing an image of an object, the eyepiece having an optical system, and the optical system comprising a first lens and a second lens having a positive refractive power, which are disposed in order from an object, the optical system being characterized in that a contact multi-layer diffractive optics, which has a first optical element formed with a relief pattern and a second optical element, which is in contact with the surface of the first optical element where the relief pattern is formed, is disposed on an optical surface of the first lens or the second lens, and characterized in that the difference of refractive indexes on a d-line between the first optical element and the second optical element is 0.45 or less, and the following expression is satisfied:

$$0.002 < D/f < 2.0$$

where D is an air distance on an optical axis between the first lens and the second lens, and f is a focal length of the entire optical system.

* * * * *